(12) United States Patent
Runyan et al.

(10) Patent No.: US 9,609,126 B2
(45) Date of Patent: Mar. 28, 2017

(54) USER DEVICE DETECTION AND INTEGRATION FOR AN IVR SYSTEM

(71) Applicant: EBAY INC., San Jose, CA (US)

(72) Inventors: Billy Runyan, Austin, TX (US); Liang Xi, Elkhorn, NE (US); Rahul Nair, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/708,529

(22) Filed: May 11, 2015

(65) Prior Publication Data
US 2016/0337516 A1 Nov. 17, 2016

(51) Int. Cl.
*H04M 3/42* (2006.01)
*H04M 3/493* (2006.01)
*H04W 4/16* (2009.01)
*H04M 1/725* (2006.01)

(52) U.S. Cl.
CPC ....... *H04M 3/4935* (2013.01); *H04M 1/7255* (2013.01); *H04M 1/72583* (2013.01); *H04M 3/4936* (2013.01); *H04W 4/16* (2013.01)

(58) Field of Classification Search
CPC ... H04L 29/06027; H04L 45/42; H04L 51/14; H04L 67/327; H04L 12/1859; H04M 2201/38; H04M 2201/40; H04M 3/42263

USPC ...................................................... 455/414.1
See application file for complete search history.

(56) References Cited

U.S. PATENT DOCUMENTS

| | | | |
|---|---|---|---|
| 7,574,486 B1 | 8/2009 | Cheng et al. | |
| 8,175,651 B2 | 5/2012 | Rios et al. | |
| 8,204,184 B2 | 6/2012 | Gao et al. | |
| 8,548,135 B1 * | 10/2013 | Lavian ................. | H04M 3/493 379/142.06 |
| 2006/0217823 A1 | 9/2006 | Hussey | |
| 2009/0204407 A1 * | 8/2009 | Shields ............... | H04M 3/4933 704/270.1 |
| 2014/0379826 A1 * | 12/2014 | Hertz .................... | H04L 51/046 709/206 |

* cited by examiner

*Primary Examiner* — Kwasi Karikari
(74) *Attorney, Agent, or Firm* — Haynes and Boone, LLP

(57) ABSTRACT

A system and method includes one or more processors one or more processors coupled to a memory. The one or more processors may execute instructions from the memory to perform the steps including receiving an audio communications request from a first user device of a user, identifying a second user device of the user in response to receiving the audio communications request, providing a suggestion that the user use the second user device with the system, receiving a response from the user responding to the suggestion, establishing a communication channel with the second user device, and providing content associated with the audio communications request to the second user device.

20 Claims, 6 Drawing Sheets

USER DEVICE DETECTION AND INTEGRATION FOR AN IVR SYSTEM

BACKGROUND

Field of the Disclosure

The present disclosure generally relates to interactive voice response systems, and more specifically, to systems and methods for integrating multiple user devices with an interactive voice response system.

Related Art

As a way of reducing costs, many entities incorporate interactive voice response (IVR) systems to direct and guide telephone call traffic to aid a caller to proper personnel or recording of an IVR menu. The caller may be attempting to reach customer support, talk to a person in a particular department, find a tutorial and/or the like. However, IVR systems can be frustrating for the caller in many cases. Callers may have to speak or push number keys on their phone to navigate through a long menu tree. In some cases, callers may drill down an incorrect path of a menu tree and have to start over from the beginning to reach their intended destination. In some cases, callers will attempt to skip the IVR system to go straight to an operator, which defeats the purpose of the IVR system. Furthermore, current IVR systems are poor at handling groups of callers calling for the same issue. For example, many callers may call about a service outage and clog up the IVR system with this single issue. With past IVR systems, an operator would have to deal with each caller individually one by one. This is because IVR systems tend to be an inflexible and unable to efficiently address dynamic problems and situations.

Additionally, past IVR systems are unable to take advantage of new technologies that have developed. For example, the IVR system was originally developed for client telephones communicating over PSTN or cellular networks and has not been changed to function cooperatively with smartphones beyond voice communications. There a plethora of higher functioning user devices that have become ubiquitous and could be advantageously integrated with an IVR system to give a better user experience, especially now that unified communications are possible using IP based communications. It would be beneficial if devices such as the smart TV, smart phones, tablet computers, and the like could be integrated with IVR calls to provide a better experience to a caller.

Thus, a more flexible IVR system which detects and integrates multiple user devices would be desirable.

Figure 1:
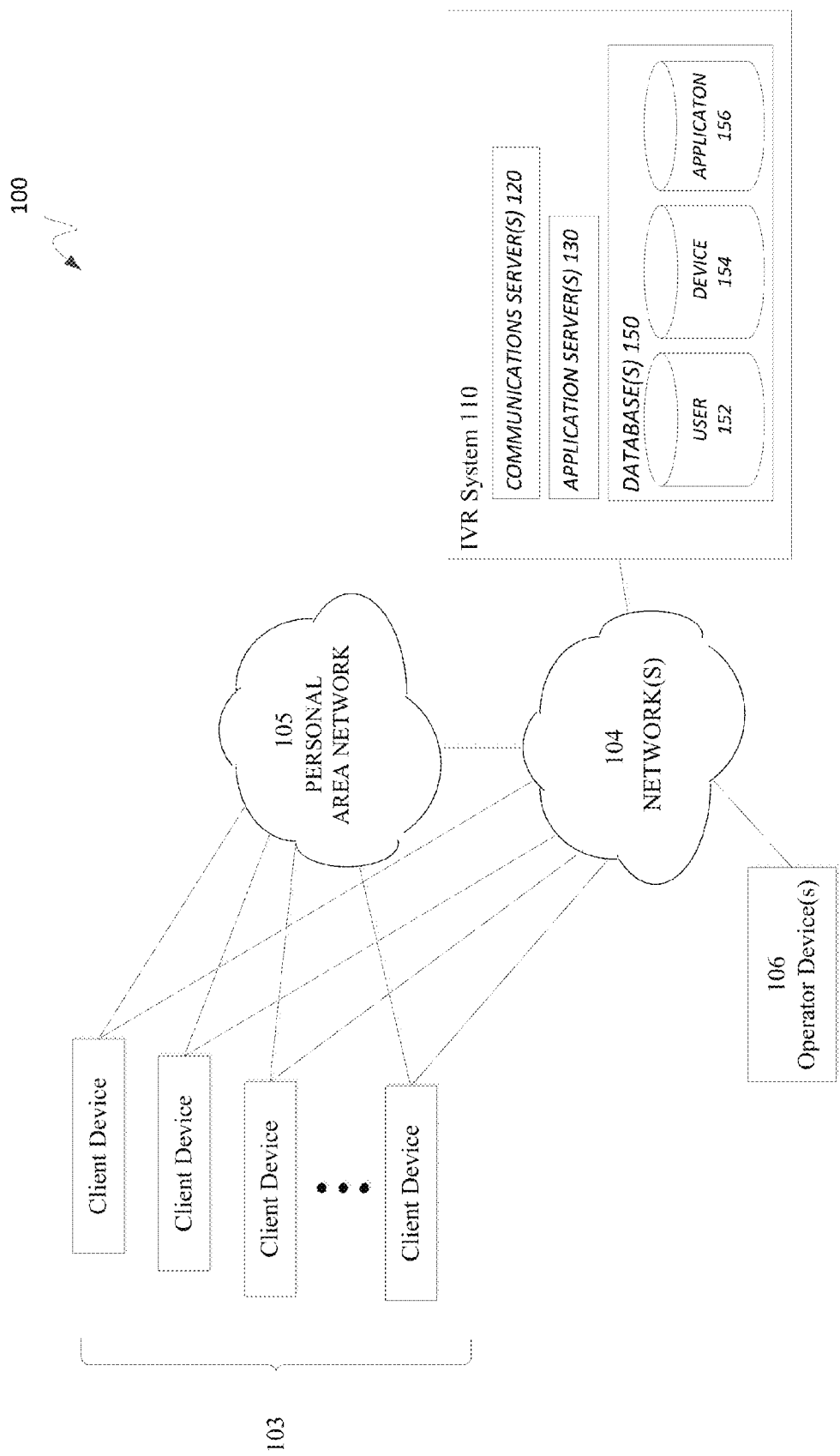
FIG. 1 is a block diagram of an exemplary system for integrating user devices with an IVR call.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Some embodiments disclosed herein include an IVR system that is capable integrating (e.g., adding) and/or switching a device that has called into the IVR system to another device. For example, a caller may have called the IVR system using a telephone connected to a PSTN network and the IVR system may facilitate the switching to and/or integration of another device with the telephone, such as a television, smart phone, tablet device, personal computer, and/or the like. In some examples, the IVR system may suggest a device and/or detect available user devices for integration/switching. In some examples, the suggestions may be based on user input, such as selections of one or more menu tree options provided by the IVR system. An IVR system may convey menu tree options through pre-recordings and the caller may select the menu tree options through voice command, a number key press on the telephone, and/or the like. The IVR system may use these selection choices to determine one or more devices for recommendation. For example, if a user chose a menu option requesting help on fixing their telephone, the system may suggest that the user switch and/or integrate a television set to the call. In this manner, the IVR system may facilitate the display of a video tutorial showing the caller how to fix the telephone or a video conference with technical support personnel.

In some examples, the IVR system may detect and integrate computing devices, such as a tablet computer and/or smart phone with an IVR call to help navigate menus of an IVR system. For example, instead of having to use voice commands and/or touch tone button presses to navigate a menu tree, the menu tree may be shown on a display of a computing device. The menu may be interactive where a user may use a touch screen and/or other input devices to select a menu tree option. This could be in lieu of the IVR system playing a prerecording of IVR menu options one at a time as a user selects each menu tree category and subcategory.

In some examples, the IVR system may integrate and/or switch a call to a device with a display. The IVR system may cause the device to display additional information that is not generally available over traditional IVR phone calls. For example, the IVR system may display information about the queue for getting in contact with an operator for one or more subject matters and/or menu categories. In some examples, the IVR system may provide the caller the options to click on a link and join a chat room, a video conference call, and/or other modes of communications. In some examples, the options may be tailored to the user device and/or available user devices.

In some examples, the IVR system may be able to detect/predict what device the user is calling from and/or the capabilities of the user device. In some examples, the IVR system may be able to detect/predict what devices are available to the caller for integrating with a present IVR call. The IVR system may recommend devices for integrating/switching a device with a device currently being used for an IVR call based on the predicted/detected available devices, device capabilities, and/or the like.

In some embodiments an IVR system includes one or more processors coupled to a memory with instructions. The processor may execute the instructions from the memory to perform several processes. The processes may include receiving an audio communications request from a first user device of a user, identifying a second user device of the user, establishing an audio communication channel with the first device, playing an audio recording suggesting that the user communicatively connect the second device with the IVR system, receiving a response from the user device responding to the audio recording, and establishing a second communication channel with the second device when the response from the user device indicates an agreement to communicatively connect the second devices with the IVR system.

In some embodiments, a computer implemented method comprises receiving an audio communications request from a first user device of a user, identifying a second user device of the user in response to receiving the audio communications request, establishing an audio communication channel with the first device, playing, through the audio communication channel, an audio recording suggesting that the user communicatively connect the second device, receiving a response from the user device responding to the audio recording, and establishing a second communication channel with the second device when the response from the user device indicates an agreement to communicatively connect the second device.

In some embodiments, a non-transitory computer-readable medium having instructions that, when executed by a processor, performs a method. The method may include receiving an audio communications request from a first user device of a user, identifying a second user device of the user in response to receiving the audio communications request, establishing an audio communication channel with the first device, playing, through the audio communication channel, an audio recording suggesting that the user communicatively connect the second device, receiving a response from the user device responding to the audio recording, and establishing a second communication channel with the second device when the response from the user device indicates an agreement to communicatively connect the second device.

In some embodiments, an IVR system includes one or more processors coupled to a memory. The one or more processors may execute instructions from the memory to perform the steps including receiving an audio communications request from a first user device of a user, identifying a second user device of the user in response to receiving the audio communications request, providing a suggestion that the user use the second user device with the IVR system, receiving a response from the user responding to the suggestion, establishing a communication channel with the second user device, and providing content associated with the audio communications request to the second user device.

In some embodiments, a computer implemented method includes receiving an audio communications request from a first user device of a user, connecting the first user device with an IVR service and identifying a second user device of the user in response to receiving the audio communications request, providing a suggestion that the user use the second device with the IVR service, receiving a response from the user responding to the suggestion, establishing a communication channel with the second device, and providing content associated with the IVR service to the second user device.

FIG. 1 illustrates an exemplary embodiment of system 100 for integrating user devices to an IVR call. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more client devices 103, such as a landline telephone, laptop, a mobile computing device, a tablet, a PC, a wearable device, a cellular telephone, smart phone, smart television (TV), digital media player, virtual reality headsets and/or the like.

One or more of client devices 103 may provide one or more client programs, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of the client programs may display various graphical user interfaces (GUIs) to present information to and/or receive information from one or more users of client devices 103. In some embodiments, client programs may include one or more applications configured to conduct some or all of the functionalities and/or processes discussed below.

In some embodiments, a non-transitory computer-readable medium includes instructions that, when executed by a processor, performs several method steps. The method steps may include receiving an audio communications request from a first user device of a user, connecting the first user device with an IVR service and identifying a second user device of the user in response to receiving the audio communications request, providing a suggestion that the user use a second user device with the IVR service, receiving a response from the user responding to the suggestion, establishing a communication channel with the second user device, and providing content associated with the IVR service to the second user device.

As shown, client devices 103 may be communicatively coupled via one or more networks 104 to IVR system 110. IVR system 110 may be structured, arranged, and/or configured to allow client devices 103 to establish one or more communications sessions to IVR system 110. Accordingly, a communications session between client devices 103 and IVR system 110 may involve the unidirectional and/or bidirectional exchange of information and may occur over one or more types of networks 104 depending on the mode of communication. While the embodiment of FIG. 1 illustrates a computing system 100 deployed in a client-server operating environment, it is to be understood that other suitable operating environments and/or architectures may be used in accordance with the described embodiments.

Communications between client devices 103 and the IVR system 110 may be sent and received over one or more networks 104 such as the Internet, a WAN, a WWAN, a WLAN, a mobile telephone network, Bluetooth, WiFi, NFC, a landline/public switched telephone network (PSTN), as well as other suitable networks. Any of a wide variety of suitable communication types between client devices 103 and system 110 may take place, as will be readily appreciated. For example, wireless communications of any suitable form may take place between client devices 103 and system 110, such as that which often occurs in the case of mobile phones or other personal and/or mobile devices.

In some embodiments, client devices 103 may be owned, managed, or operated by a single entity, such as a person. For example client devices 103 may include a smart watch, smart phone, smart TV, tablet computer, personal computer, laptop, digital media player (e.g., Chromecast, Roku, Fire TV, Apple TV, etc.), and/or the like. In some embodiments client devices 103 may form a mesh network and/or a personal area network 105. Personal area network 105 may be created using short range wireless communicators such as Bluetooth®, Bluetooth® low energy, wireless infrared communications, wireless USB, Wi-Fi or other wireless technologies for exchanging data over short distances. In some embodiments, one or more of client devices 103 may act as a wireless hotspot for other client devices 103 to connect to one or more networks 104 and communicate with IVR system 110.

In some embodiments, computing system 100 may include one or more operator devices 106 communicatively connected to client devices 103 and/or IVR system 110 through one or more networks 104. In some examples, IVR system 110 may route calls and/or facilitate communications from one or more client device 103 to one or more operator devices 106. In some embodiments, operator devices 106 may be devices held in a call center.

IVR system 110 may comprise one or more communications servers 120 to provide suitable interfaces that enable communication using various modes of communication and/or via one or more networks 104. Communications servers 120 may include a web server, an API server, and/or a messaging server to provide interfaces to one or more application servers 130. Application servers 130 of IVR system 110 may be structured, arranged, and/or configured to provide access to one or more applications. In some examples, the application servers 130 may run an IVR application for answering phone calls, playing prerecorded voice responses, a menu tree, transferring a call to an appropriate operator, and/or the like. The IVR application may be tailored to the type of phone service being provided, such as telephone banking, tech support, voting, payment services, and/or the like. Application servers 130 may also include one or more applications for payment security, payment authorization, device authentication, account access, account security, payment handling, call switching, device detection, VoIP, instant messaging, and/or the like.

In various embodiments, client devices 103 may communicate with application servers 130 of IVR system 110 via one or more interfaces provided by communication servers 120. It may be appreciated that IVR system 110 may be structured, arranged, and/or configured to communicate with various types of client devices 104 and operator devices 106.

Application servers 130, in turn, may be coupled to and capable of accessing one or more databases 150 including, but not limited to, a user database 152, a device database 154, and/or application database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments. In some embodiments, the information held in the databases 150 may be stored on one or more of client devices 103. The data may be held in a distributed fashion and/or redundant fashion.

Figure 2:
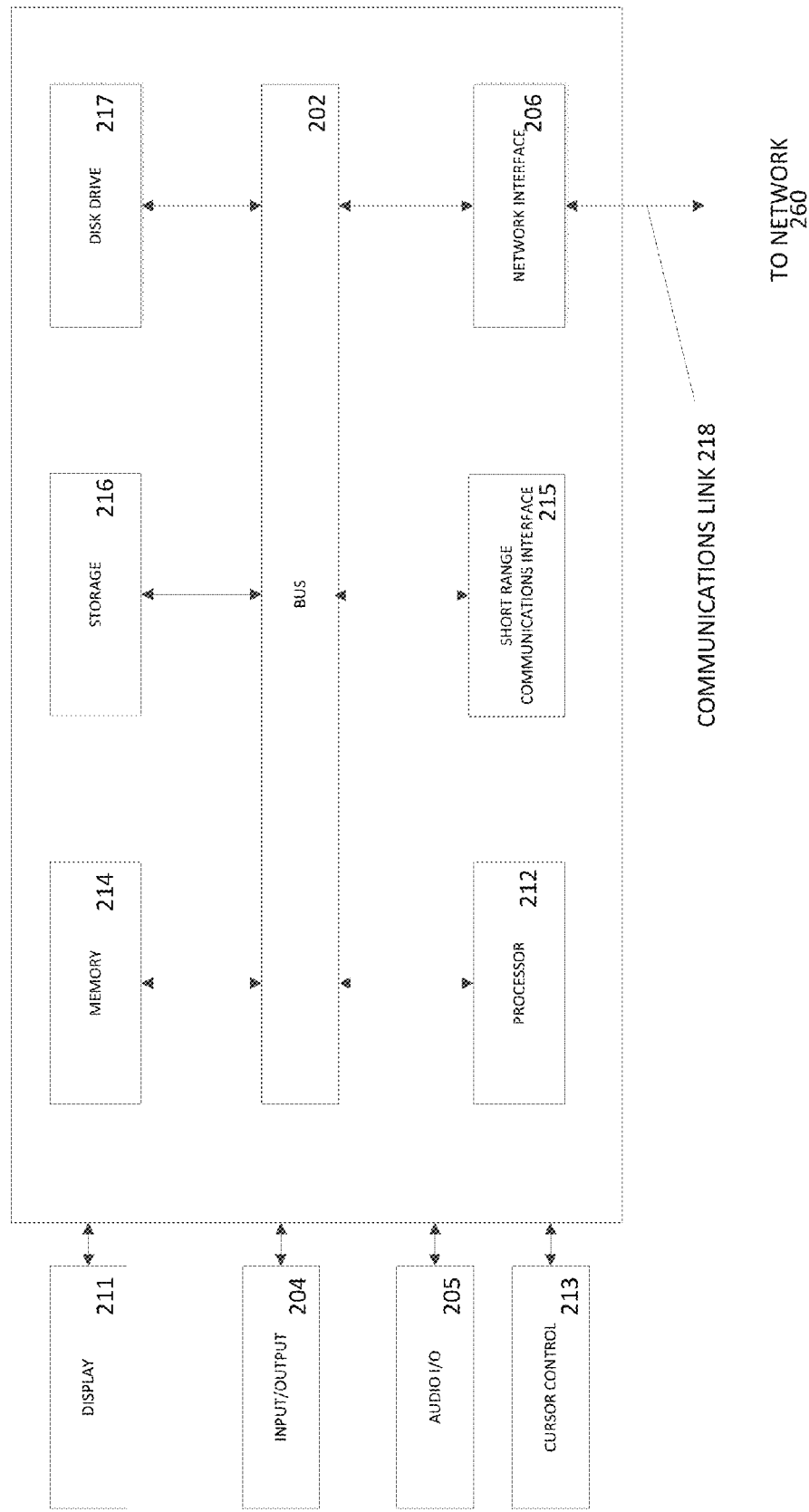
FIG. 2 is a block diagram of an exemplary computer system suitable for implementing one or more devices of the computing system in FIG. 1 and the embodiments in this disclosure.

FIG. 2 illustrates an exemplary computer system 200 in block diagram format suitable for implementing on one or more devices of the computing system in FIG. 1 and/or the embodiments discussed herein. In various implementations, a device that includes computer system 200 may comprise a personal computing device (e.g., a smart or mobile phone, a computing tablet, a personal computer, laptop, wearable device, PDA, Bluetooth device, etc.) that is capable of communicating with a network or another device. In some examples, computer system 200 may be a network computing device (e.g., a network server). It should be appreciated that each of the devices of the computer system in FIG. 1 may be implemented as computer system 200 in a manner as follows.

Computer system 200 may include a bus 202 or other communication mechanisms for communicating information data, signals, and information between various components of computer system 200. Computer system 200 may include an input/output (I/O) component 204 that processes a user action, such as selecting keys from a keypad/keyboard, selecting one or more buttons, links, actuatable elements, etc., and sends a corresponding signal to bus 202. Computer system 200 may also include a display 211 which may display information. In some embodiments, display 211 may double as a I/O component. For example, display 211 may be a touch screen device. In some embodiments, computer system 200 may include an audio input/output component 205. Audio input/output component 205 may be able to transmit and/or receive audio signals to and/or from the user.

Computer system 200 may include a near short range communications interface 215. Short range communications interface 215 may be capable of exchanging data with other devices with short range communications interfaces. In some embodiments computer system 200 may have several short range communications interfaces using different communication protocols and may join one or more networks using short range communications interface 215.

Short range communications interface 215, in various embodiments, may include transceiver circuitry and/or an antenna. Short range communications interface 215 may use one or more short-range wireless communication technologies and standards (e.g., WiFi, Bluetooth, Bluetooth low energy, infrared, etc.).

Short range communications interface 215, in various embodiments, may be configured to detect other devices with short range communications technology near computer system 200. Short range communications interface 215 may create a communication area for detecting other devices with short range communication capabilities. When other devices with short range communications capabilities are placed in the communication area of short range communications interface 215, short range communications interface 215 may detect the other devices and exchange data with the other devices. Short range communications interface 215 may receive identifier data packets from the other devices when in sufficiently close proximity. The identifier data packets may include one or more identifiers, which may be operating system registry entries, cookies associated with an application, identifiers associated with hardware of the other device, or various other appropriate identifiers. The identifiers may be used to identify the capabilities of the other device, make and/or model of the device, and/or the like.

In some embodiments, short range communications interface 215 may identify a local area network using a short range communications protocol, such as WiFi, and join the local area network. In some examples, computer system 200 may discover and/or communicate with other devices that are a part of the local area network using short range communications interface 215. In some embodiments, short range communications interface 215 may further exchange data and information with the other devices that are communicatively coupled with short range communications interface 215.

Computer system 200 may have a transceiver or network interface 206 that transmits and receives signals between computer system 200 and other devices, such as another user device, a merchant server, an email server, application service provider, web server, a social networking server, a payment provider server, and/or other servers via a network. In various embodiments, this transmission may be wireless, although other transmission mediums and methods may also be suitable. A processor 212, which may be a microcontroller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, IVR system 110, or both. Where applicable, the ordering of various steps described herein may be changed, combined into composite steps, and/or separated into substeps to provide features described herein.

The foregoing networks, systems, devices, and numerous variations thereof may be used to implement one or more services, such as the services discussed above and in more detail below.

Figure 3:
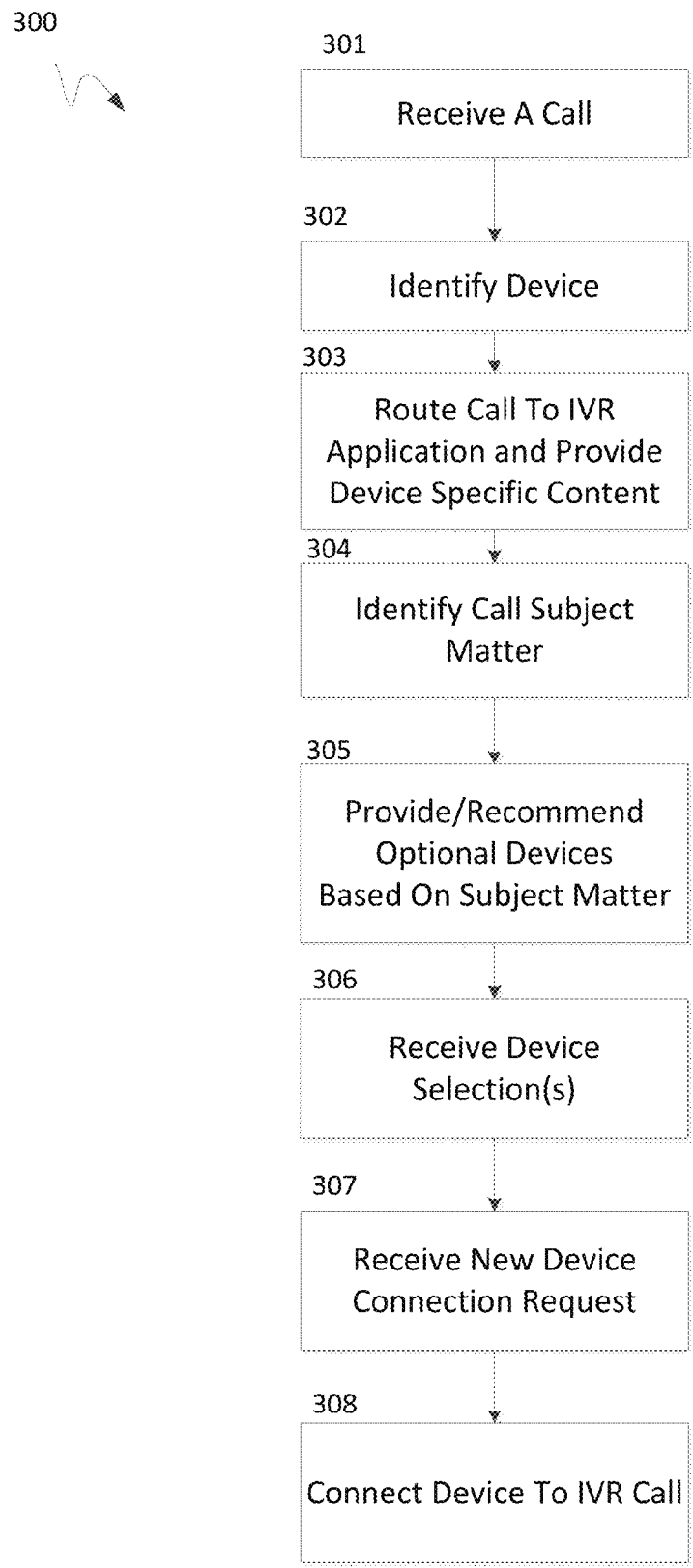
FIG. 3 is a flow diagram illustrating an exemplary method performed by and IVR system for integrating user devices to an IVR call.

FIG. 3 is a flow diagram illustrating an exemplary method 300 for integrating additional devices to an IVR call. Method 300 may include one or more processes 301-308.

At process 301 the system, such as IVR system 110 of FIG. 1, may receive a telephone call and/or other requests for audio communications. This phone call may come from a user device, such as one of client devices 103 of FIG. 1, over one or more communication channels such as the PSTN, cellular network, IP network, and/or the like. In some examples, devices calling through an IP network may be using a software application designed to integrate and communicate with the system such that the system can conduct other internet based services with the calling device. Other internet based services may include, but are not limited to, video calls, video playback, display of an image, application functionality, web page display, and/or the like. The call coming over the IP network may use one or more communication protocols; one of the protocols may be a VoIP protocol such as SIP, H.323, MGCP, SCCP, and/or the like.

At process 302, the system may identify the device and/or device capabilities of the device conducting the telephone call received at process 301. The system may implement one or more techniques for identifying the calling device and its capabilities. In some examples, the system may identify the calling device based on the method and/or audio communication channels used. For example, if the call passes through a PSTN gateway, the system may determine and/or predict that the calling device is a landline telephone using the PSTN. Similarly if the call passes through a GSM, CDMA, or other cellular gateway, the system may determine or predict that the device is a mobile phone. Additionally, when a call does not transfer through a gateway and is received over the internet using VoIP, the system may determine and/or predict that the device is a network/internet enabled device. In some examples, the system may identify the device capabilities based on and/or from the communication protocol and/or protocols that the device uses to connect with the system. For example, the XMPP protocol has feature negotiation and discovery protocols which allow a system to query the capabilities and features of a device communicating with the system. As such, the system may request functionality information from the calling device. For example, the system may determine if the device has conferencing capabilities, a display and/or camera, certain operating systems, software applications, web browsing capabilities, and/or the like.

In some embodiments, the system may receive and/or request a device identifier which identifies the device make, model, and/or the like. The system may use the device identifier to determine the device's capabilities. For example, the system may have one or more databases, such as device databases 154 of FIG. 1, associating devices with device capabilities and use the database to determine the capabilities of the calling device.

In some embodiments, the system may determine the device type and/or capabilities based on the software identifiers that are provided by the device. For example, some communication protocols allow for the application user agent to identity itself by providing a user agent header field in a data packet. The user agent header may provide information such as such as the type of application being run, the operating system on the device, software vendor, software version number, and/or the like. The system may be able to determine the capabilities of the device from the capabilities of the software being run on the device. For example, the system may have a database, such as application database 156 of FIG. 1, associating applications with application capabilities and use the database to identify the capabilities of the device/application being run on the device.

In some embodiments, the system may be able to determine the capabilities of a device based on the phone number the device is calling to reach the system. For example, the calling device may be calling the system using a phone number, IP address, and/or the like (collectively referred to as a "calling number") which the system may recognize as being provided as part of a programming application or dedicated to calls from devices using a software application. The calling number may not be advertised and/or public such that the system could predict that any calls using that number are from devices using a programming application.

At process 303, the system may route/connect the call to an IVR application which may provide an audio IVR menu. In some embodiments, the IVR application may be an application run by the system that provides and receives audio feedback to and from a caller such that a caller may navigate a menu tree. In some example, the IVR application may use VoiceXML ("VXML"). However, other proprietary and/or standard programing languages may be used for the IVR application.

In some embodiments, the system may also provide additional functionalities and/or features based on the identified user device at process 302. For example, the system may recognize that the user is calling using an application capable of conducting communication protocols for video, web content, images, and/or other application communications. In some embodiments, the additional communication protocols and application capabilities supported on the device may include the ability to provide an interactive display. In such cases, the system may enable, control, and/or provide a graphical user interface (GUI) menu on a user device for navigating and/or skipping through the IVR application menu tree. The GUI may also provide additional functionalities and information that are discussed in more detail below.

At process 304, the system may identify the content or subject matter that the caller is calling about. In some examples, this may be determined by tracking where the user is navigating through the IVR application menu tree. IVR applications generally have decision trees with broad categories at the beginning, such as technical support, billing, customer service, operator, account information, and/or the like. The system may use the categories in the decision tree to identify the subject matter, and the subject matter determination may become more and more specific and/or accurate as the user drills through the menu tree of the IVR application. For example the category may have a form such as "support>device set up>operating system A," wherein each field is an additional branch and/or subcategory on a menu tree that the caller may have traversed.

At process 305, the system may determine that the subject matter that the user is calling about may be better addressed with another device and recommend devices for the user to transfer the IVR call to or view in conjunction with the IVR call. For example, if a person is calling from a mobile device they are trying to trouble shoot, the system may recommend that the user integrate another device with the IVR system, such as a landline phone, so that the user can freely trouble shoot the mobile device without disconnecting or disengaging from the IVR system. In some examples, the system may determine that the subject matter is better addressed with another device because the calling device is incapable of providing some content. In some examples, having a display, a larger display, a mouse, keyboard, and/or touch screen may be beneficial in addressing the subject matter of a call, but those capabilities may be lacking on the calling device. For example, the IVR system may determine that the caller is calling about an issue with a purchase and a screen may help provide information about the purchase. The user may be calling about a purchase received that did not fit its description, and the IVR system may display the purchase item and its description for the user to double check. In some examples the IVR system may also play an ad, such as an ad related to a product the user is calling about. For example if the caller is calling about a purchase problem, the system may advertise another product that does not have this problem. The system may provide clickable links for ease of purchase. In some embodiments, some of this content may be displayed while the user is waiting for an operator. In some embodiments, the system may detect the available devices for the user and provide a recommendation based on the available devices. The system may recommend that the caller switch to a user device with a large display such that a tutorial video to trouble shoot a problem can be provided and viewed or more easily viewed. Similarly, the system may recommend that the call be transferred to a personal computer or another device that is capable of joining a chat room with other individuals having similar issues. The system may also recommend a device with a touch screen be used for answering a survey. In some examples the system may recommend a device capable of running a web application and/or device application such that the system can cause the device to display content, such as an online streaming a tutorial video. In some examples, the system may route the caller to an operator, and the system may provide capabilities to an operator device, such as operator device 106 of FIG. 1, for aiding the operator in suggesting and/or transferring a caller to a different device.

In some embodiments, the system may provide the caller with several options of devices to the user for integrating or transferring the IVR call. In some examples, the options may be provided through audio instructions from the IVR application or a push/text notification to one or more devices different from the one placing the IVR call. In some embodiments, the system may create separate queues for different devices and recommend a device where the queues are shorter. For example there may be no queue when joining a chat room but a long queue for an audio communication with an operator. In some examples, there may be a separate queue for callers willing to conduct video conferences to solve their issues. The video conference queue may be shorter because callers may be less willing to do a video conference and/or because video conferences solve issues quicker.

At process 306, the system may receive a selection from the user in the form of a voice command, a button press, which may be identified by its tone if the device uses dual tone multi-frequency DTMF signaling, and/or the like. In response the system may provide a session code or identifier, which may be a unique string of numbers, for identifying the caller. This code or identifier may be used to integrate another device with the IVR call and/or transfer an IVR call from one device to another device. In some embodiments, multiple devices may be integrated with the IVR call. For example, a user may integrate a tablet device, television, and/or other devices with a landline phone call. Each device may be used for a unique functionality to that device.

In some embodiments, the user device may be in communications with the system using a software agent capable of relaying GUI interface commands to the server. For example, a user device may have an application displaying a menu tree for the IVR system with each menu option being an actuatable button. The actuation of one or more buttons in the GUI may send a signal to the system through the software agent, and the system may recognize the user selection from the signal.

At process 307, the system may receive a communication request from a new device and receive the same code and/or identifier that were provided at process 306. In this manner, the system can integrate the new device with the appropriate IVR call by matching the code and/or identifier. The system may then provide content tailored for the new device. In some examples, the system may check for the device capabilities, application, and/or device identifiers to ensure that the tailored content can be rendered on the new device. For example, a video conference may use a certain video codec and the system may check that the application on the user device is capable of playing the video codec.

In some examples, the caller may have been waiting in a line for a live agent or operator to answer their call and their place in line may be maintained with the new device. In some embodiments, the system may have separate call waiting lines depending on the device and move the caller to a new line based on the new device being used with the system. In some examples, device recommendations to the user at process 305 may also come with queue indicators and/or wait times that might change if the user switches and/or integrate another device. This may be used as an incentive to motivate the caller to switch to and/or integrate a different device with the system. A different device may aid the operator or the IVR system to handle the subject matter for the user quicker and/or in bulk with multiple users. As a result, queues for operators may be reduced and the efficiency of the IVR system may be increased. For example, the IVR system may recognize that there are a lot of calls with a certain city area codes directed to the subject matter of "service outage" and set up a forum to address "service outage" calls from those area codes in bulk/parallel. The IVR system may recognize that a video conference of multiple callers or a chat room with multiple callers to a single operator may be more efficient than having an operator address each caller individually from the queue. In response to recognizing that forum may be more efficient for addressing callers, the IVR system may implement a new communication format and recommend callers to switch to devices capable of communicating in the new communication format to have their issues addressed. A more detailed discussion on setting up new communication formats based on high volume subject matter is discussed in more detailed below and may be implemented in process 307.

In some embodiments, the IVR system may encourage certain devices such that ads can be shown to the caller while they are waiting. For example, playing video ads on a device may help pay for call centers. The system may let a caller skip other callers in line for an operator and/or join an accelerated queue to an operator if the caller agrees to switch to a device that is capable of displaying the ads.

Figure 4:
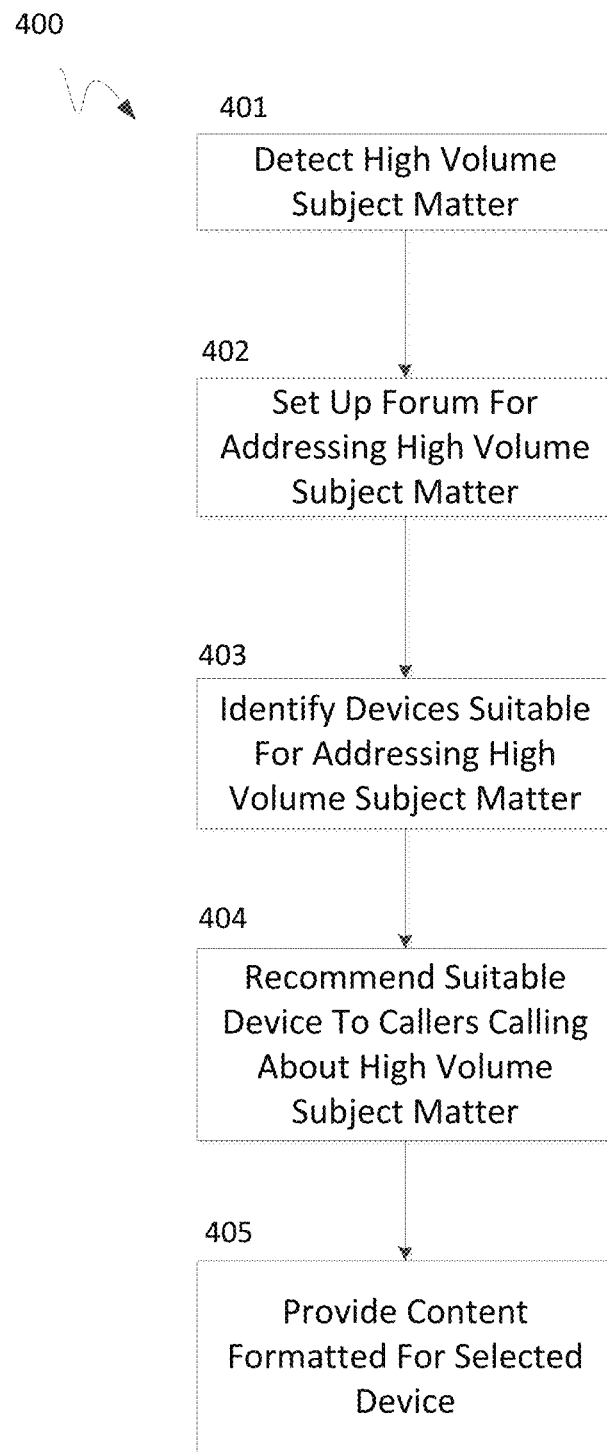
FIG. 4 is a flow diagram illustrating an exemplary method of dynamically creating communication modes to address high volume calls.

FIG. 4 is a flow diagram illustrating an exemplary method 400 for implementing an IVR system that dynamically creates communication formats for addressing high volume calls.

At process 401, the system may detect a high volume of calls for a particular subject matter. The system may implement one or more pattern recognition algorithms for detecting the high volume calls for a subject matter. In some examples, the system may detect a high volume of calls or wait times for callers calling a particular department, such as technical support. The system may recognize a pattern where there are many callers choosing the same menu branch in an IVR application decision tree and/or calling about the same or similar matters. For example, the system may count and/or keep a count of the number of callers calling about a particular subject matter. The subject matter may be categories and/or subcategories of a decision tree in an IVR application. The system may have a threshold value which is considered as high volume. The threshold value may be predetermined and/or set by an administrator of the system and when the number of callers passes the threshold, the system may recognize that subject matter as having a high volume of calls.

In some embodiments, the system may predict wait times for operators to detect high volume calls for a subject matter. For example, the system may count the number of callers waiting in line for an operator for a particular subject matter, measure the average time it takes for a caller to have their issue resolved with an operator, and determine the wait time by multiplying the average time and the number of callers in line.

At process 402, the system may setup a forum for addressing high call volume subject matters. In some examples, the forum may be automatically created, such as a chat room, a video conference, a tutorial video and/or the like. The forum may be created depending on the subject matter. For example, a service outage may be better addressed with a chat room or a persistent textual forum where past discussions can be reviewed. In this manner an operator can address the issue without having to repeat themselves because the historic answers may be reviewed by new callers joining the forum. In some embodiments, each subject matter may have a predetermined forum that the system creates when the system detects a high volume of calls for that subject matter.

In some examples, the system may alert an operator, administrator, or someone else that a certain subject matter is getting unusually high volume of callers and/or that there are unusually long wait times. The system may also suggest that a new communication forum be created to address the large volume of callers. The operator, administrator, or someone else may respond by choosing one of the new communication formats suggested by the system and/or setting up a new communication format. In some examples, the suggested communication format may be based on a statistical analysis on the devices the users are calling from. For example, if a majority of callers are calling using a smartphone, the system may suggest a communication format compatible with the smartphone.

At process 403, the system may determine device capabilities and/or devices that may be suitable for participating in the new communication format. Some communication formats may require capabilities such as, video playback, instant messaging, access to a web browser, has certain software installs, ability to communicate with certain software, and/or the like.

At process 404, the system may have the IVR application provide callers with the option to join the new communication format when the system detects that the user is using a devices with suitable capabilities. In some examples, the system may recommend callers to switch to devices that have suitable capabilities and join the new communication format. The recommendation may be a audio recording provided through an IVR application that also provides a way of indicating to the system that the user wishes to change to another device. For example, the system may listen for a voice command or a button press that would indicate that the user wishes to switch devices.

At process 405, the system may route callers to the new communication format when callers using devices with suitable capabilities chooses to join the new communication format or switches to a device with suitable capabilities. For example, the calling device may be running an application capable of receiving video and/or instant messaging communications from the system. The system may begin communicating with the calling device through the application using the new communication format. This may include using one or more communication protocols that may be different than the communication protocol used to initially call the system and/or IVR application. In some examples, the content may be formatted for the device. For example, the content may be formatted for screen size, input/out devices (e.g. touch screen, mouse, keyboard, etc.), battery life, available applications, and/or the like of the device.

In some embodiments, the user device may be incapable of communicating in the new communication format and may have to switch to another calling device. The system help facilitate switching devices by providing a code and/or call identifier to identify the current place, position, and/or state of the IVR call. In this manner, the user may switch devices without losing their place in an IVR call by providing the code and/or call identifier. The system may, when receiving a code and/or call identifier, transfer the call to a place, position, and/or state associated with the code and/or call identifier.

In some embodiments, the user may be able to integrate several devices with the IVR call. For example, the system may recommend that the user use a television as part of the IVR call to show a video, a land line telephone for the user to communicate with an operator, and a tablet for navigating a menu tree.

Figure 5:
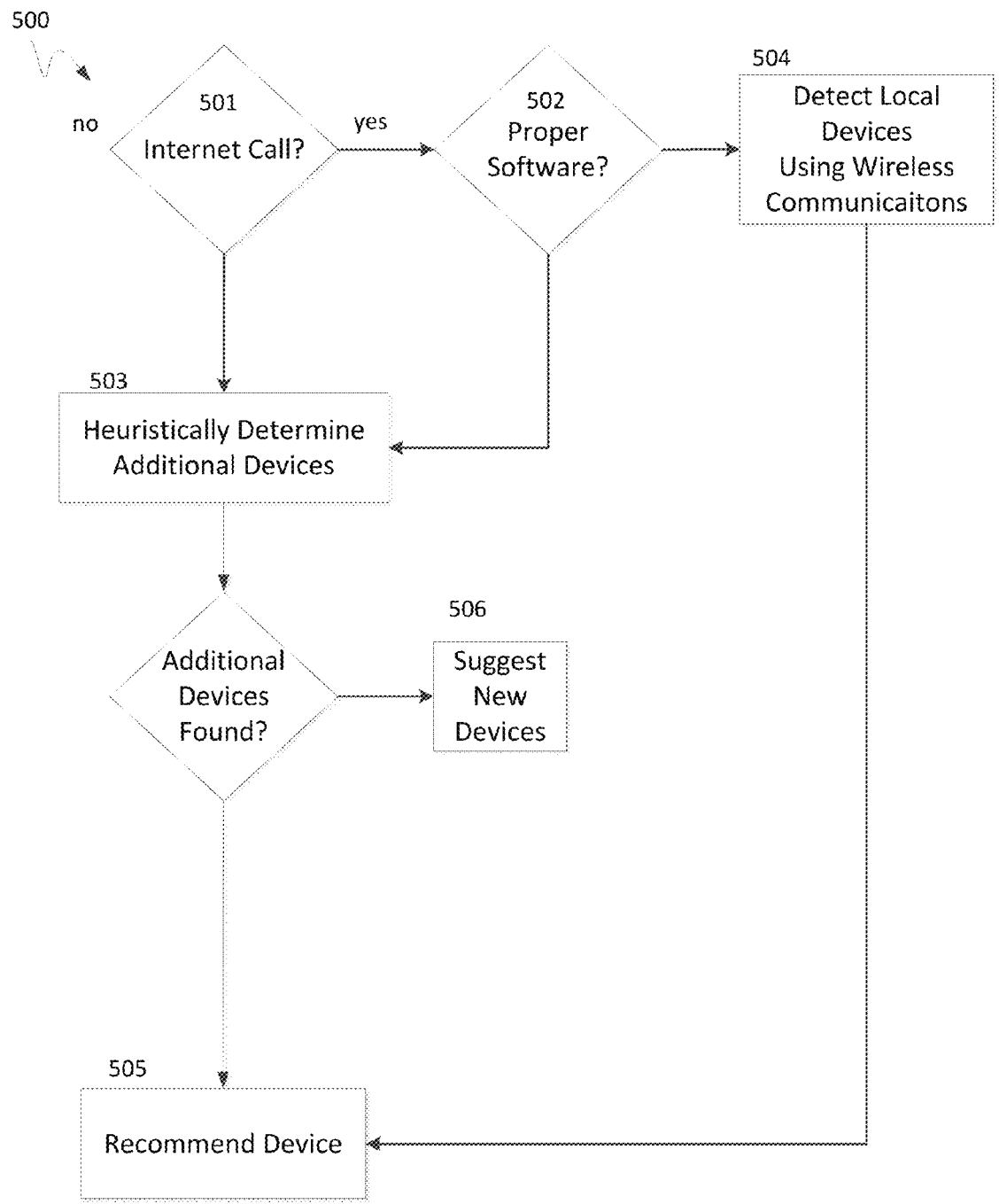
FIG. 5 is a flow diagram illustrating an exemplary method for detecting available user devices for integrating with an IVR call and providing a recommendation based on the available devices.

FIG. 5 is a flow diagram illustrating an exemplary method 500 for detecting alternative user devices for recommending during an IVR call. The alternative devices may be devices that the IVR call could be transferred to from a present calling device and/or used for integrating with a present calling device. In some examples, method 500 may be used in process 305 of FIG. 3.

At process 501, the system may determine whether a device is calling through the internet. This may be determined based on the communication protocols used and/or whether the call is routed through a gateway for converting communications from one network to another. For example, if a call is routed through a gateway, such as a gateway for converting communications over PSTN to VoIP, the system may recognize that this call is not internet based. If the call is pure VoIP and is not being passed through a gateway, the system may assume that the device is calling over the internet. In some examples, the system may assume that a call is internet based if the call is using additional internet based communication protocols along with VoIP. When the system determines that the call is internet based, the system may continue to process 502 to detect the capabilities of the calling device. When the system determines that the call is using protocols for non-internet networks (e.g. PSTN, GSM, CDMA, etc.), the system may continue to process 503 to determine available user devices using heuristic methods.

At process 502, the system may determine the capabilities of the calling device and whether the device has the ability to detect nearby devices. For example, the system may check to see if the calling device is a part of a network of user devices. In some examples, the system may check to see if the calling device has Bluetooth capabilities and the ability to ping or detect other devices. In some examples, the system may check to see if the device is part of a personal area network. These capabilities may be determined by evaluating the software on the device, the device make and/or model, device versions, and/or the like.

When the calling device does have the proper capabilities the system may continue to process 504 to detect available devices. When the calling device does not have the proper capabilities to detect available devices, the system may continue to process 503 to determine available devices based on heuristic methods.

At process 504, the system may request the device to detect for additional available user devices. This may be a command sent to the device to use a wireless communication protocol, such as Bluetooth and/or other personal area network communications, to identify devices nearby (e.g. communicatively connected by a local area network) and relay this information to the system. Based on the received response and available devices, the system may recommend a device at process 505. In some embodiments, the system may store the detected available devices in a database associated with the caller, caller's ID, phone number, and/or the like for future references.

At process 503, the system may heuristically determine available user devices. In some examples, the system may request the user to identify additional devices that the user is able to conduct a call with. This may be a voice recording played by an IVR application and a request to press or provide a response with a voice command and/or button indicating devices that the user has available. In some embodiments, the system may check a database for a user account associated with the caller. For example, the system may cross check the phone number of the caller with a database for other devices that might be associated with that number or person calling from that number.

If the system has no records of any additional devices at process 503, the system may, at process 506, suggest the user use one or more other devices from a predetermined list of devices. The system may present the list of devices as a voice recording where the user may respond with a voice command and/or a button press. The system may also provide the option for the user to continue the IVR call with the current device used. In some examples, if the user selects a new device, the system may record the new device in a database associated with the phone number the user called from. In another embodiment, the system may determine locations of various devices associated with the user, such as based on GPS or other location-determining components in the devices. Devices associated with the user, which may be determined from a user account that includes devices associated with the account, and located nearby may be identified as one or more devices for integrating with the IVR call.

If the system determines at process 503 that there are other devices available to the user, the system may, at process 505, recommend that the user switch to or additional use one of the available devices. In some examples, process 505 may recommend a device based on queue lengths, available communication modes, tailored communication modes for a particular subject matters and/or the like. In some examples, process 505 may recommend a combination of devices based on the functionality of available devices and the content. For example, some content may be suitable for a large display and a keyboard, but the user may have a TV and a small screened tablet device available. In cases like these, the system may recommend that both the TV and the tablet be integrated for the call, the TV for the screen and the tablet for a virtual keyboard. In some examples, the system may recommend devices based on the type of content (e.g. video, chat room, survey, application, etc.). In some examples, there may be content tailored for one or more particular devices, and the system may recommend one or more devices such that one or more of the tailored contents are accessible to the user.

Figure 6:
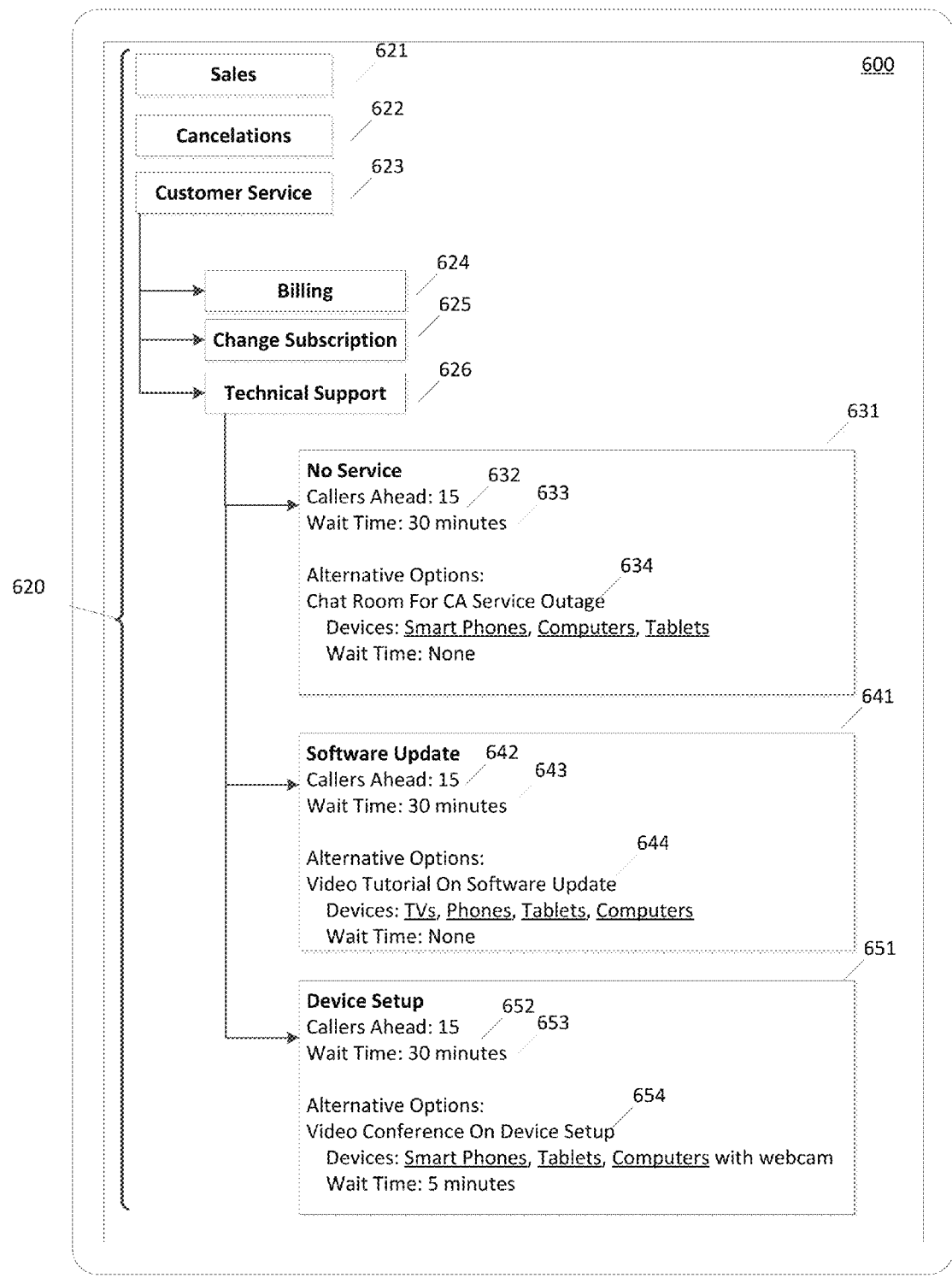
FIG. 6 is an exemplary GUI 600 that may be displayed on a user device to help navigate an IVR system.

FIG. 6 is an exemplary GUI 600 that may be displayed on a user device to help navigate an IVR system. In some embodiments a system, such as IVR system 110 of FIG. 1, may cause an application to display GUI 600 on a user device when the user device is in communication with the system.

In some embodiments, GUI 600 may display a menu tree 620 that corresponds to a menu tree of an IVR application on the system. The menu tree may have selectable categories and subcategories 621-626, 631, 641, and 651. In some embodiments, the displayed categories and subcategories may be actuatable elements which a user may select by tapping on a touch screen display in the area of the displayed categories/subcategories and/or clicking on the displayed categories/subcategories using a software pointer. In some examples, the software pointer may be controlled by an external peripheral, such as a mouse. Other methods of selecting a category/subcategory of a menu tree would be apparent to one of ordinary skill in the art and are contemplated herein.

In some embodiments, the selection on one or more categories and subcategories may expand the menu tree to display additional subcategories. For example, selecting the customer service category 623 may cause GUI 600 to expand the menu tree to display billing subcategory 624, change subscription subcategory 625, and technical support subcategory 262. Similarly, clicking on the technical support subcategory 626 may cause GUI 600 to expand the technical support subcategory 626 to display no service subcategory 631, software update subcategory 641, and device setup subcategory 651. Subcategories 631, 641, and 651 may also be edge menu tree options and/or options at the end of menu.

In some embodiments, edge menu tree options 631, 641, and 651 may be selectable. Selecting one or more of the edge menu tree options may send a signal to an IVR application to connect the device communicatively with an operator. In some examples, the device may join a call queue to one or more operators.

In some embodiments, when there is a call queue, GUI 600 may display additional information regarding the queue. For example, GUI 600 may display an indication of the queue 632, 642, and/or 652 which may display the number of callers in line ahead of the user. In some examples, GUI 600 may display the approximated wait times 633, 643, and 653 for the queues.

In some embodiments, GUI 600 may display alternative communication modes and corresponding devices for addressing a subject matter. For example, the device may allow for the user to switch from an IVR call to a chat room 634, video tutorial 644, and/or video conference 654. GUI 600 may also provide queue information for the alternative options, such as alternate wait times. In some embodiments, the GUI may provide selectable links that allow the user to switch to an alternative communication mode, the links specifying a particular compatible device.

In some examples, the alternative options may specify particular subject matter that it would be addressing. For example, chat room 634 may be specifically addressing service outages in California.

Thus, when a user dials in or otherwise engages with an IVR service, one or more additional or alternate devices may be used to augment or improve the user experience. Other devices may be automatically detected, suggested, and/or connected based on determinations of content the user may want, device capabilities and power levels, location, and the like. For example, a device may be low on power and thus not selected for additional use, especially if the device is a primary or device the user operates a lot. In another example, if a device is detected in a movie theater (or other location where audible sounds may be an issue), the device may not be selected if the content would produce sound others may hear. It should be noted that the determination and subsequent communication of content to a new device may occur throughout a call initiated through IVR, such as when a selected device is no longer operable or able to provide content (e.g., lost or sporadic connectivity, low or loss of power, etc.).

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, omitted, combined into composite steps, and/or separated into sub-steps to provide one or more features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to execute instructions from the non-transitory memory to cause the system to perform operations comprising:
   receiving an audio communications request from a first user device associated with a user;
   in response to receiving the audio communications request, connecting the first user device with an Interactive Voice Response (IVR) service;
   determining a user-selectable menu associated with the IVR service;
   determining a first type of content associated with the user-selectable menu;
   identifying a second user device associated with the user wherein the second user device is separate from the first user device;
   providing, based on the first type of content, a suggestion that the user use the second user device to interact with the IVR service;
   receiving a response from the user responding to the suggestion;
   establishing a communication channel with the second user device; and
   providing the first type of content associated with the IVR service to the second user device.

2. The system of claim 1, wherein identifying the second user device comprises: requesting the first user device to identify the second user device.

3. The system of claim 1, wherein identifying the second user device comprises:
   determining a phone number associated with the first user device; and
   identifying the second user device based on the phone number.

4. The system of claim 1, wherein the second user device is identified responsive to determining that the first user device is unavailable to provide the first type of content to the user.

5. The system of claim 1, wherein the communication channel allows for instant messaging.

6. The system of claim 1 wherein, the operations further comprise:
   suggesting a third user device; and
   establishing a second communication channel with the third user device.

7. A method comprising:
   receiving an audio communications request from a first user device associated with a user;
   in response to receiving the audio communications request, connecting the first user device with an Interactive Voice Response (IVR) service;
   determining a user-selectable menu associated with the IVR service;
   determining a first type of content associated with the user-selectable menu;
   identifying a second user device associated with the user, wherein the second user device is separate from the first user device;
   providing, based on the first type of content, a suggestion that the user use the second user device to interact with the IVR service;
   receiving a response from the user responding to the suggestion;
   establishing a communication channel with the second user device; and
   providing the first type of content associated with the IVR service to the second user device.

8. The method of claim 7, wherein establishing a communication channel with the second user device comprises establishing a VoIP connection with the second user device.

9. The method of claim 7, further comprising causing the second device to display a menu tree associated with user-selectable menu.

10. The method of claim 9, wherein causing the second device to display the menu tree comprises causing the second device to display a first queue for a first operator for a first mode of communication.

11. The method of claim 10, wherein causing display of the first queue comprises causing a display of an estimated wait time.

12. The method of claim 11, wherein the suggestion is provided on the first user device.

13. The method of claim 11, wherein the suggestion is provided on the second user device.

14. A non-transitory machine-readable computer medium having stored thereon machine-readable instructions executable to cause a machine to perform operations comprising:
- receiving an audio communications request from a first user device associated with a user;
- in response to receiving the audio communications request, connecting the first user device with an Interactive Voice Response (IVR) service;
- determining a user-selectable menu associated with the IVR service;
- determining a first type of content associated with the user-selectable menu;
- identifying a second user device associated with the user wherein the second user device is separate from the first user device;
- providing, based on the first type of content, a suggestion that the user use the second user device to interact with the IVR service;
- receiving a response from the user responding to the suggestion;
- establishing a communication channel with the second user device; and
- providing the first type of content associated with the IVR service to the second user device.

15. The non-transitory machine-readable medium of claim 14, wherein providing the suggestion that the user use a second user device with the IVR service is through push notification.

16. The non-transitory machine-readable medium of claim 15, wherein the push notification is sent to the second device.

17. The non-transitory machine-readable medium of claim 14, wherein the suggestion is provided on the first user device.

18. The non-transitory machine-readable medium of claim 14, wherein the suggestion is provided on the second user device.

19. The non-transitory machine-readable medium of claim 14, wherein the first type of content comprises a video or visual image.

20. The non-transitory machine-readable medium of claim 14, wherein the first user device is a phone and the second user device comprises a television, a personal computer, a smart phone, or a computing tablet.

* * * * *